(12) United States Patent
Cozens et al.

(10) Patent No.: US 7,621,483 B2
(45) Date of Patent: Nov. 24, 2009

(54) AIRCRAFT AND FUEL VENTING SYSTEM THEREFOR

(75) Inventors: Simon John Cozens, Bristol (GB);
Jeffrey Mark Brown, Chepstow (GB);
Michel Tran Van, Bristol (GB)

(73) Assignee: Airbus UK Limited, Bristol (GB)

( * ) Notice: Subject to any disclaimer, the term of this patent is extended or adjusted under 35 U.S.C. 154(b) by 660 days.

(21) Appl. No.: 11/112,859

(22) Filed: Apr. 22, 2005

(65) Prior Publication Data

US 2005/0241700 A1    Nov. 3, 2005

(30) Foreign Application Priority Data

Apr. 29, 2004   (GB)   ................... 0409593.1

(51) Int. Cl.
*B64D 37/04*    (2006.01)

(52) U.S. Cl. ................. 244/135 R; 137/589; 137/899.2

(58) Field of Classification Search ............ 137/899.2, 137/589, 571; 244/135 C, 135 R, 135 B, 244/135 A, 136; 239/171; 60/39.094
See application file for complete search history.

(56) References Cited

U.S. PATENT DOCUMENTS

| 2,250,762 | A | * | 7/1941 | Haberlin | ............. 244/136 |
| 2,356,906 | A | * | 8/1944 | Zitza | ............. 244/135 R |
| 3,419,233 | A |   | 12/1968 | Wotton | |
| 3,732,668 | A | * | 5/1973 | Nichols | ............. 96/174 |
| 4,913,380 | A | * | 4/1990 | Vardaman et al. | ....... 244/135 R |
| 2003/0218098 | A1 |   | 11/2003 | Goto et al. | |

FOREIGN PATENT DOCUMENTS

| EP | 0867367 | 9/1998 |
| GB | 618109 | 2/1949 |
| GB | 802294 | 7/1956 |
| GB | 981305 | 11/1961 |

OTHER PUBLICATIONS

Reese, *Simplified Fuel Systems for Light Aircraft*, Ted Smith Aircraft Co., Inc., Mar. 26-28, 1969, pp. 1-7.
Osols, *Reliability Concepts in the Design of the Boeing 707 Fuel Systems*, SAE National Aeronautic Meeting, Sep. 29-Oct. 4, 1958, pp. 1-8.
Walker, *Fuel System of the Trident*, Shell Aviation News, No. 310, 1964, pp. 17-21.

* cited by examiner

*Primary Examiner*—Stephen Hepperle
*Assistant Examiner*—Andrew J Rost
(74) *Attorney, Agent, or Firm*—Patterson, Thuente, Skaar & Christensen, P.A.

(57) ABSTRACT

An aircraft comprising a plurality of fuel tanks in each wing is arranged such that each fuel tank is provided with a venting pipe connected to a single venting chamber. The venting chamber is itself located in a central fuel tank located in the wing centre-box and is thus located inwardly of at least two of the fuel tanks. The venting chamber has two venting pipes each being connected via a respective surge tank in each wing to the exterior of the aircraft.

13 Claims, 3 Drawing Sheets

AIRCRAFT AND FUEL VENTING SYSTEM THEREFOR

BACKGROUND OF THE INVENTION

1. Field of the Invention

The present invention relates to an aircraft and a fuel venting system therefor, in particular, but not exclusively large, multi-engined aircraft with anhedral wings.

2. Description of the Related Art

Large, multi-engined aircraft are often provided with fuel tanks defined by internal spaces within the wings of the aircraft. Furthermore, internal wing space is used efficiently so that internal space elsewhere in the aircraft is not taken-up by fuel. Such fuel tanks generally need to be vented to enable air to flow into and out of the space above the fuel. For example, air is drawn into the tank when fuel is consumed, during descent or jettison or when dispensing fuel in air-to-air refuelling and air passes out of the tank during ascent or receiving fuel during refuelling.

A first known system comprises a series of fuel tanks (typically three) spaced along an aircraft wing, each with a venting pipe individually connected to a surge tank (an overflow tank that prevents unwanted ejection of fuel from the aircraft) located near the tip of the wing. The surge tank is provided with means to permit venting to atmosphere. Each tank is able to vent independently to the surge tank.

The first known system suffers from various problems. For example, it is difficult, owing to space constraints, to incorporate all of the pipe-work into the wingtip. Also, the design requires relatively high fuel tank pressures to be tolerated, because of restrictions, resulting from the vent system design, on the rates of air and fuel flow thus an increase in the strength of the fuel tanks is required, which, in turn, leads to an undesirable increase in mass.

A second known venting system vents all of the fuel tanks through a common venting line. Each tank is directly connected to the common line so that only one vent pipe connects to the surge tank. This reduces the problem associated with the first known system of there being restricted space in the wingtip. The second system, however, presents problems of its own. For example, an overflow from one fuel tank may cause flooding of the common venting line, thus possibly preventing venting of other fuel tanks. An overflowing tank could directly feed into another tank without the overflow being detected, which can cause undesirable uneven weight distribution in one wing compared to another. Furthermore the design also suffers from having to tolerate relatively high fuel tank pressures, thus requiring an increase in the strength of the fuel tanks, and the consequent undesirable increase in weight.

SUMMARY OF THE INVENTION

The present invention seeks to provide an improved fuel storage and venting system and/or to provide a fuel storage and ventilating system that alleviates one or more of the above-mentioned problems with the prior art.

There is provided in accordance with a first aspect of the present invention, an aircraft comprising a plurality of fuel storage chambers located within said aircraft, at least one of said fuel storage chambers being located within a wing of said aircraft, said wing having an outward portion associated with the wingtip and an inward portion, each of at least two of the fuel storage chambers being provided with a venting conduit for permitting fluid communication with a venting chamber of a venting chamber system, wherein the venting chamber is located inwardly of said at least one fuel storage chamber and has a venting outlet for permitting fluid communication between the venting chamber and the exterior of the aircraft.

Thus, the present invention provides independent venting of fuel storage chambers, while reducing the bulk and complexity of the pipe-work in the wingtip of the aircraft.

The venting chamber may be used in lieu of, or in addition to, a surge tank located near the tip of a wing.

The aircraft preferably comprises a venting chamber conduit provided between the venting outlet of the venting chamber and an overflow chamber, the overflow chamber being provided with an overflow venting outlet for permitting fluid communication between the overflow chamber and the exterior of the aircraft. The overflow chamber is preferably located in the outward portion of the wing. The overflow chamber may be in the form of a surge tank.

The fuel storage chambers may be in the form of fuel tanks that, apart from being adapted for use in accordance with the present invention are conventional in arrangement and configuration.

The venting chamber may therefore be used in association with an overflow chamber that helps prevent accidental discharge of fuel from the aircraft.

It is preferred that the venting chamber is located inward of two, more preferably inward of said at least two, and most preferably all, of the fuel storage chambers located within the wing. In this manner, the majority of the venting pipe-work may be associated with the inward portion of the wing, which has more space for the provision of pipe-work than the outward portion of the wing. It is further preferred that the venting chamber is positioned in a central location, for example above, below, or in the fuselage of the aircraft. The venting chamber may be located within a fuel storage chamber, preferably a fuel storage chamber located centrally relative to the wings. That fuel storage chamber may thus be located inward of the inward portion of each wing, for example being position in the wing centre-box, or in the fuselage adjacent thereto The venting chamber is preferably sealed such that fuel in the fuel storage chamber may only enter the venting chamber through a conduit connected to the venting chamber, such as a conduit connecting the fuel storage chamber and the venting chamber. Having a relatively central location for the venting chamber, may assist in the venting of fuel storage chambers in two wings of an aircraft.

The wing may be a dihedral wing. However, the present invention has particular application in the case where the wing is an anhedral wing. Advantageously, in such a wing configuration, fuel that has been accidentally discharged from the fuel storage chambers tends to flow under gravity back towards the fuel storage chambers, rather than towards the venting chamber.

The aircraft may be provided with a pump for pumping fuel into one or more of the fuel storage chambers. This is particularly advantageous, for example, when the aircraft comprises an overflow chamber, such as a surge tank for example, and the wing is an anhedral wing; the orientation of the wing will ensure that gravity resists spontaneous flow of fuel from a surge tank located in the outward portion of a wing to a fuel storage chamber, and thus it is advantageous to be able to pump the fuel back to a fuel storage chamber. Alternatively or additionally, the aircraft may be provided with a pump to remove fuel from the venting chamber. Such an arrangement further reduces the risk of fuel being inadvertently discharged from the aircraft.

In one arrangement, when the aircraft is in a normal level-flight attitude the venting conduits may enter the venting chamber vertically above the venting outlet. This ensures that any fuel discharged into the venting chamber is unlikely to be transferred back into such a venting conduit where it may cause a blockage.

In an alternative arrangement, the venting conduits may enter the venting chamber below the venting outlet. In this arrangement, it is preferred that the venting chamber is further provided with a fuel outlet located towards or at the bottom of the venting chamber for removing fuel therefrom. A pump may preferably be provided to assist removal of the fuel via the fuel outlet. This arrangement mitigates against the level of fuel rising sufficiently such that fuel enters the venting conduits from the venting chamber.

Each of said at least two fuel storage chambers may be associated with, or possibly located within, the same wing of the aircraft. However, it is preferred that each of said at least two fuel storage chambers is associated with, and preferably located within, a mutually different wing of the aircraft. This allows one venting chamber to function for two wings of an aircraft.

The venting chamber may comprise a plurality of venting outlets for permitting fluid communication between the venting chamber and the exterior of the aircraft. This gives redundancy in venting such that, if one outlet becomes blocked, then another outlet may be usable.

The venting chamber system may comprise a plurality of venting regions in fluid communication with each other, but arranged such that during level flight of the aircraft the flow of fuel, if any is present, from one of the venting regions to another of the venting regions is restricted (such fuel being present for example in the event of overflow of fuel from a fuel storage chamber via a venting conduit to the venting chamber). This allows movement of gases between venting regions (and thus, for example, facilitates venting from fuel storage chambers associated with one wing through the overflow chambers, or surge tanks, associated with a second wing), but limits flow of fuel between such regions (reducing unwanted fuel transfer).

The venting chamber system may comprise only one venting chamber, with the venting regions being defined within the venting chamber. At least two of the venting regions may be defined within the venting chamber by one or more substantially liquid-impermeable partitions that allow venting gases to flow from one venting region to another. This provides a convenient arrangement inhibiting unwanted fuel flow, whilst permitting gas transfer between venting regions.

Alternatively, the venting chamber system may comprise a plurality of venting chambers. In this case, each of at least two of the venting regions may be located within a separate venting chamber. For example, each of at least two of the venting regions may be defined by a separate venting chamber. A conduit may be provided to connect venting regions to provide fluid communication.

It is preferred that each of the venting regions is associated with one or more fuel storage chambers, the fuel storage chambers associated with one of the venting regions all being different from those associated with another of the venting regions. For example, the fuel storage chambers associated with one of the venting regions may all be located in one wing, the fuel storage chambers associated with another of the venting regions all being located in a different wing.

Each of the one or more fuel storage chambers associated with a respective venting region may be provided with a venting conduit permitting fluid communication with the venting region.

Each venting region may be provided with a separate venting chamber outlet for permitting fluid communication between the venting region and the exterior of the aircraft. This allows venting of one wing through an overflow chamber in the other wing, this being of particular use should one of the venting chamber outlets become restricted. Thus, overflow pressures caused by venting conduits being restricted by overflowing fuel may be significantly reduced. The structure of the fuel storage chamber may therefore be designed to withstand lower fuel overflow pressures and there may therefore be a consequent weight saving.

It is preferred that at least one of the venting conduits associated with a fuel storage chamber is provided with a valve arrangement that is arranged to restrict the overflow of fuel into the venting conduit. The valve arrangement may be so configured that when the aircraft adopts a predetermined orientation, then the valve arrangement causes the conduit to become closed. It is further preferred that the valve arrangement causes the conduit to become closed when the aircraft adopts an orientation in which the aircraft exceeds a predetermined nose-up attitude, a predetermined nose-down attitude or a predetermined roll angle. This helps mitigate against transfer of fuel from the fuel storage chambers into the venting chamber system during take-off, climb, descent (particularly emergency descent) and landing. The valve arrangement may comprise first and second valves, the first valve being arranged to close when the aircraft adopts the predetermined nose-up attitude, and the second valve being arranged to close when the aircraft adopt the predetermined nose-down attitude. It is preferred that one or both of the first and second valves is a float valve.

Preferably, at least one of the fuel storage chambers is connected to a single venting conduit via a plurality of venting outlets within the fuel storage chamber. Each respective fuel storage chamber may be connected via only one venting conduit.

The venting chamber system is preferably so arranged to reduce the undesirable effects of crosswinds. Such crosswinds may for example occur in the case where a fuel storage chamber is vented to atmosphere via a plurality of independent lines and there exists a pressure difference between two of the vent lines. (Such independent venting lines are often used in the prior art to reduce the problems associated with relying on a single vent line only per fuel tank; as fuel might overflow into a single vent line and cause significant overflow pressures). The crosswinds may for example have the undesirable effects of removing fuel vapour by evaporation and removing inert gas. Any of several features that reduces the magnitude of the crosswinds across the fuel storage chambers or encourages any such crosswinds to flow across the venting chamber (as opposed to across the fuel storage chambers) may reduce the undesirable effects of crosswinds. For example, the effects of crosswinds may be reduced by means of the venting chamber being provided in addition to an overflow chamber, by means of the provision of a venting chamber that is connected to two overflow chambers, by means of each fuel storage tank being connected to atmosphere via a single venting conduit (that for example passes to atmosphere via the venting chamber), and/or by means of the venting chamber being sealed. A venting conduit, associated with one of the fuel storage chambers located within a wing, may be arranged such that it extends inward from a fuel storage chamber venting outlet. The fuel storage chamber venting outlet is preferably located towards the trailing edge of said wing. The venting conduit may connect said venting outlet via a forwardly, and preferably upwardly, extending portion located within the fuel storage chamber to the venting chamber system. The venting conduit preferably connects said venting outlet via an inwardly extending portion located within the fuel storage chamber to the venting chamber system. For example, said venting conduit may connect said venting outlet via a forwardly extending portion and via an inwardly extending portion to the venting chamber system, the portions being arranged in series and within the fuel storage chamber. The forwardly extending portion is preferably, but not necessarily, downstream (closer to the venting outlet) of the inwardly extending portion. The venting conduit may connect said venting outlet via a further backwardly extending portion located within the fuel storage chamber to the venting chamber system. Such a backwardly extending portion may for example be provided upstream of the inwardly and/or the forwardly extending portions, for example so that said venting conduit connects said venting outlet via a first forwardly extending portion then via a second inwardly extending portion and then via a third backwardly extending portion to the venting chamber system. The forwardly extending portion may extend forward and inward from said venting outlet. The inwardly extending portion may also extend forwardly and/or backwardly. The backwardly extending portion may also extend inwardly.

One or more of the aforementioned portions of the venting conduit located within the fuel storage chamber may include a high point arranged to reduce the flow of fuel from the fuel storage chamber upstream through the venting conduit. One or more of the aforementioned portions of the venting conduit located within the fuel storage chamber may include one or more additional outlets to permit more than one route for venting gas to be passed into the fuel storage chamber. The or each outlet may be associated with a valve, for example a float valve, that is arranged to reduce the chance of fuel flowing from the fuel storage chamber via the relevant outlet into the venting conduit. Providing one or more conduit portions in arrangements such as those described above, especially in an aircraft having anhedral wings, may assist in reducing fuel loss from the fuel storage chamber into the venting chamber system.

In accordance with a second aspect of the present invention there is provided an aircraft comprising a plurality of fuel storage chambers disposed within said aircraft, wherein at least one of the fuel storage chambers is provided with a venting conduit permitting fluid communication with a venting chamber of a venting chamber system, the venting chamber having a venting outlet for permitting fluid communication between the venting chamber and an overflow chamber, the overflow chamber being provided with an overflow venting conduit for permitting fluid communication between the overflow chamber and the exterior of the aircraft. Such an arrangement provides an additional chamber in the venting chamber system, hence reducing the likelihood of unwanted fuel loss from the aircraft.

Advantageously, each of at least two of the fuel storage chambers is provided with a venting conduit permitting fluid communication with the venting chamber. This reduces the number of conduits, or pipes, that are provided to the overflow chamber, which is often located near the tip of a wing.

At least one of the fuel storage chambers may be located within a wing having an outward portion associated with a wingtip and an inward portion wherein the venting chamber may be located inward of said at least one fuel storage chamber. This allows the venting chamber to be located in the more spacious inward portion of the wing.

The venting chamber system of the aircraft in accordance with the first or the second aspects of the present invention may be provided separately from the aircraft. Thus, in accordance with a third aspect of the present invention, there is provided a venting chamber system suitable for use as the venting chamber system of an aircraft in accordance with the first aspect or the second aspect of the present invention.

In accordance with a fourth aspect of the present invention, there is provided a method of operating a fuel storage system on an aircraft, the method comprising providing an aircraft in accordance with the first aspect or the second aspect of the present invention. The method advantageously includes causing relatively inert gas to enter the venting chamber such that said relatively inert gas passes to at least two of the fuel storage chambers through a venting conduit. The inert gas, which reduces the risk of accidental combustion of fuel or fuel vapour in the fuel storage container, may thus be provided centrally. The relatively inert gas is preferably inert relative to atmospheric air. For example, the relatively inert gas may be nitrogen-enriched air, or may be oxygen-depleted air. By causing the relatively inert gas to enter the venting chamber, better mixing of the air (or gases) in the fuel tanks with the relatively inert gas may be enabled.

It is preferred that the method comprises the step of causing said gas to enter all of the fuel storage chambers to which the venting chamber is connected. The inert gas may be caused to flow into the venting chamber at a rate determined, at least partly, by the rate of flow of fuel from the fuel storage chambers. The rate of gas flow may also be affected by the rate of descent/ascent of the aircraft.

The method may be performed in an aircraft wherein the venting chamber is connected for fluid communication with an overflow chamber, such as a surge tank for example. In such a method, fuel may overflow, unintentionally or otherwise, from one of the fuel storage chambers to the venting chamber. In such a case, the method advantageously includes a step of causing fuel to flow from the venting chamber to the overflow chamber, and preferably a further step of causing fuel to flow from the overflow chamber to a fuel storage chamber. Such a further step may for example comprise allowing fuel to flow under the influence of gravity and/or assisting the flow of fuel (for example by means of a pump).

Features described with reference to one aspect of the present invention may of course be incorporated into any of the other aspects of the invention. For example, the aircraft in accordance with the second aspect of the present invention may incorporate those features described above with reference to the aircraft of the first aspect of the present invention. For example, the valve arrangements described above with respect to the aircraft of the first aspect of the present invention may be incorporated into the aircraft in accordance with the second aspect.

BRIEF DESCRIPTION OF THE DRAWINGS

Embodiments of the invention will now be described by way of example only with reference to the accompanying drawings of which.

DETAILED DESCRIPTION OF THE DRAWINGS

Figure 1:
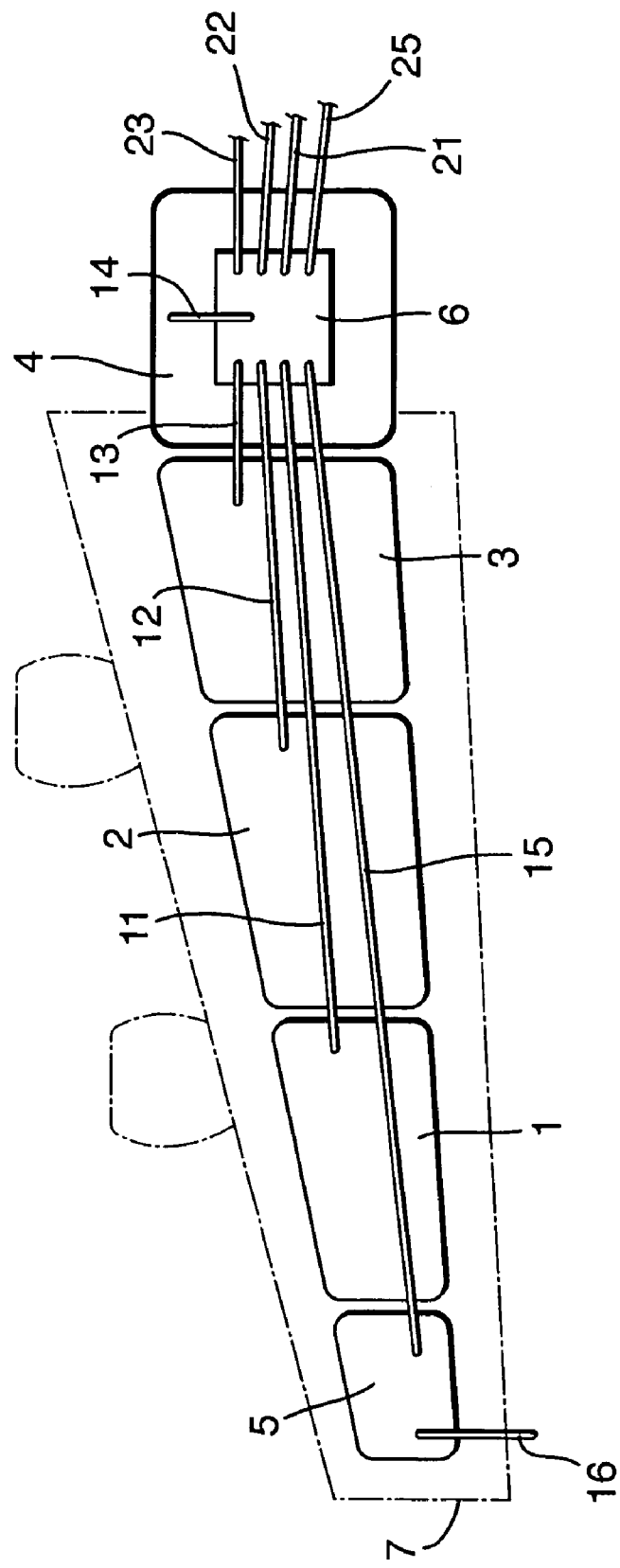
FIG. 1 is a schematic of a portion of an aircraft in accordance with an embodiment of the present invention.
Figure 2:
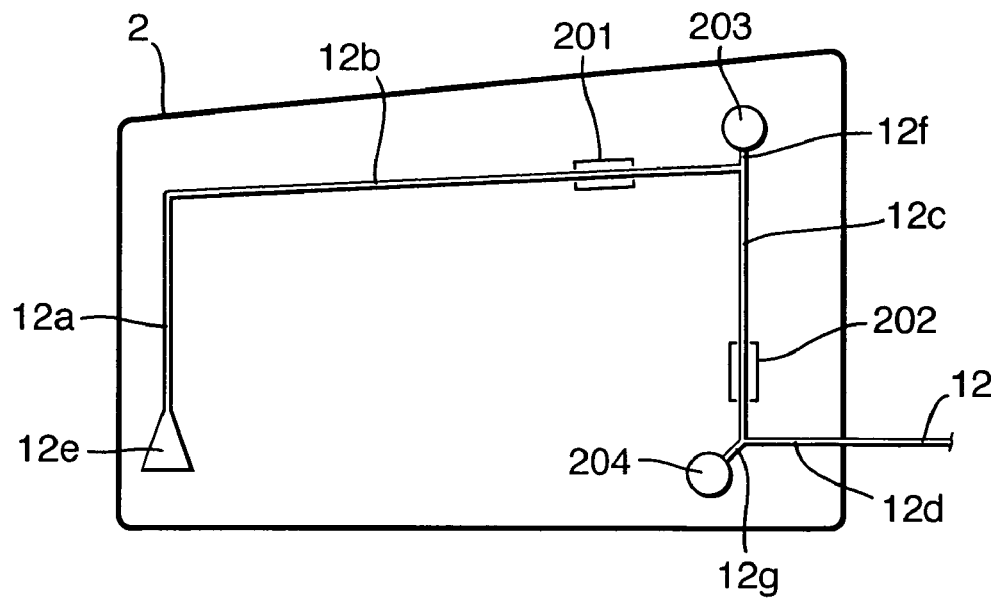
FIG. 2 is a schematic of a valve arrangement suitable for use in the embodiment of the present invention shown in FIG. 1.
Figure 3:
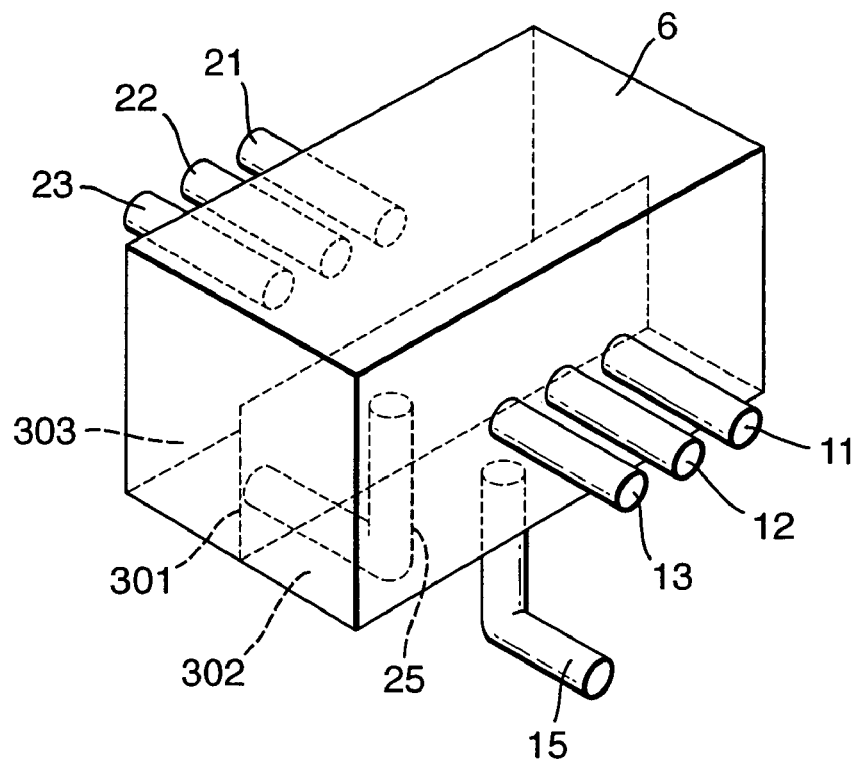
FIG. 3 is a schematic of a venting chamber suitable for use in the embodiment of the present invention shown in FIG. 1.

A fuel venting system of an aircraft according to a first embodiment of the present invention is illustrated by FIGS. 1 to 3. FIG. 1 shows a portion of an aircraft comprising an outer wing fuel tank 1, a mid-wing fuel tank 2, an inner wing fuel tank 3 and a central fuel tank 4. Each fuel tank 2, 3, 4 is provided with a respective venting pipe 11, 12, 13, 14, which is connected to a venting chamber 6 in the form of a plenum chamber. The venting chamber 6 is located in the central fuel tank 4 in the wing carry-through box of the aircraft. Apart from the pipe 14 linking the venting chamber 6 to the central fuel tank 4, the venting chamber 6 is sealed from the fuel tank 4 in which it is housed. The wing fuel tanks 1, 2, 3 are disposed within the wing 7 itself and are generally located in the voids in the interior of the wing 7. The venting chamber 6 is provided with a venting pipe 15 connected to a surge tank 5, which is, in turn, provided with a venting pipe 16 connecting the surge tank 5 to the exterior of the aircraft. The wing 7 is an anhedral wing, ensuring that, when the aircraft is at a normal attitude, the venting chamber 6 is higher than the wing fuel tanks 1, 2, 3, and thus resists siphoning to the venting chamber 6 of any fuel that may overflow into the venting pipes 11, 12, 13. The venting system is further provided with further venting pipes 21, 22, 23 leading from fuel tanks in a second wing (not shown) in a manner similar to that described with respect to wing 7. Furthermore, a venting pipe 25 leads from the venting chamber 6 to a surge tank (not shown) in the second wing substantially as described with respect to wing 7.

The surge tank 5 is located at the outward portion of the wing 7 towards the wingtip and has a two-fold purpose. Firstly, it provides, via its venting pipe 16, a means of venting gas from the venting system to atmosphere or vice versa. It also provides a reservoir in which fuel, which has been unintentionally discharged from any of the fuel tanks 1, 2, 3, 4 and into the venting chamber 6 (the venting chamber 6 is ideally kept empty of any fuel), may be collected and thus prevented from being discharged from the aircraft. The surge tank 5 is provided with surge tank overflow sensors to detect the overflow of fuel into the surge tank and thus to detect a fuel tank overflow.

A suitable conduit and pump arrangement (not shown) is provided to allow fuel to be pumped from the surge tank 5 to one or more of the fuel tanks 1, 2, 3, 4. The venting pipe 16 of the surge tank 5 is provided with a valve (not shown) that controls ingress and egress of fluid into the venting system.

The fuel tank venting pipes 11, 12, 13, 14, 21, 22, and 23 of the venting system are formed from 3" (approximately 75 mm) internal diameter cylindrical Aluminum alloy pipes, with a wall thickness of about 1 mm. The surge tank venting pipes 15, 16, and 25 are formed from 2" (approximately 50 mm) internal diameter cylindrical Aluminum alloy pipes. The fuel tanks are required to withstand a pressure of 15 psi, that is, about 100 kPa (the typical maximum internal over-pressure that would exist in the event of overflow, such high pressures occurring during refuelling).

It will be readily apparent to those skilled in the art that, whilst not necessary, it is desirable to locate the venting chamber 6 in the wing carry-through box (in the middle of the aircraft relative to the wings) of the aircraft, because the interior of the inward section of a wing is usually more spacious than the interior of the outward section, and so pipework is more easily accommodated. Furthermore, a venting chamber located centrally between two wings may service venting pipes from both wings.

The space in the venting system is filled with a relatively inert gas, such as nitrogen-enriched air. The nitrogen enriched air is produced on-board the aircraft in a manner known per se from atmospheric air drawn from outside the aircraft. Such gas fills the space in the venting system and above the fuel in the fuel tank to reduce the fire-hazard posed by the fuel. It is convenient to introduce such gas centrally into the venting system by means of supplying the inert gas via the venting chamber.

The venting pipes 11, 12, 13 are fitted with appropriate valves and are routed in a configuration in such a way as to reduce the chance of fuel escaping from the fuel tanks 1, 2, 3 into the venting chamber 6. FIG. 2 shows such a pipe and valve arrangement for the venting pipe 12 associated with the mid-wing fuel tank 2. During use, when the fuel tank is relatively full, the tank will contain fuel and a pocket of air that moves depending on the position and movement of the aircraft. To increase the chance of the venting pipe 12 being able to be in fluid communication (to allow passage of venting gas) with the fuel chamber, without the risk of ingress of fuel into the pipe 12, the pipe 12 has three outlets 12e, 12f, and 12g positioned in different spaced-apart regions in the fuel tank 2.

The end of the venting pipe 12 is connected in the mid-wing fuel tank 2 towards the trailing edge of the wing 7 and towards the outward section of the fuel tank 2. At the end of the venting pipe 12, there is provided a bellmouth outlet 12e, from which a portion 12a of the pipe 12 extends towards the wing's leading edge. When the aircraft is at a normal attitude, this venting pipe portion 12a extends away from and upwardly relative to the wing's trailing edge, so that gravity resists transfer of fuel from mid-wing fuel tank 2 into the pipe portion 12a. From the upstream end (i.e. the end furthest from the outlet 12e) of this first forwardly extending portion 12a, there extends an inwardly extending portion 12b, which leads to a backwardly extending portion 12c and then to a second inwardly extending portion 12d which passes out of the fuel tank 2. The first inwardly extending portion 12b and the backwardly extending portion 12c are each shaped to comprise a local high point (201, 202 respectively) to further resist transfer of fuel along the venting pipe 12 towards the venting chamber (not shown). Two valve-controlled outlets 12f, 12g are provided, one 12f in the region of the junction between venting pipe portions 12b and 12c on the one hand, and the other 12g in the region of the junction between venting pipe portions 12c and 12d on the other hand. Each outlet is associated with a respective float valve 203, 204. When the aircraft adopts a nose-up attitude, for example, during take-off or climbing, the float valve 204 near the junction between venting pipe portions 12c and 12d closes, thus reducing the likelihood of fuel being accidentally discharged from the mid-wing fuel tank 2 via the venting pipe 12 into the venting chamber (not shown). Similarly, when the aircraft adopts a nose-down attitude, for example, during descent, the float valve 203 near the junction between venting pipe portions 12b and 12c closes.

FIG. 3 shows a schematic representation of the venting chamber 6 used in the aircraft of FIG. 1. The venting chamber 6 is of an essentially cuboid shape, with a liquid impermeable partition 301 extending across the length of the venting chamber 6 so as to form first and second compartments 302, 303. Venting pipes 11, 12, 13, and 15 are in fluid communication with the chamber 6. Venting pipes 11, 12, and 13 are connected to the wing fuel tanks (not shown) and are mounted above the venting pipe 15 (that delivers fuel to the surge tank (not shown)) so that any fuel entering the first compartment 302 of the chamber 6 is fed to the surge tank, rather than being fed back into the venting pipes 11, 12, and 13. The partition 301 ensures that fuel discharged from one wing or side of the aircraft is fed back to the surge tank associated with that wing or side of the aircraft and is not transferred to the other wing or side of the aircraft. Such transfers would generally be undesirable because they would allow fuel to shift from one side of the aircraft to another, possibly disturbing the balance and performance of the aircraft. Venting pipes 21, 22, and 23 (associated with the fuel tanks of a second wing opposite to the first) and venting pipe 25 (associated with the surge tank of the second wing) are arranged in a similar manner to venting pipes 11, 12, 13, and 15, but on the other side of the venting chamber 6, such that fuel discharged from venting pipes 21, 22, 23 enters the second compartment 303. As mentioned above, inert gas is introduced into the venting system via the venting chamber 6. Venting pipe 14 (shown in FIG. 1) leading from the central tank 4 has been omitted from FIG. 3 for the purpose of clarity.

The partition 301 does not extend across the whole height of the venting chamber 6. Thus only one inert gas inlet is required to service all parts of the venting system. Also, because fluid communication is permitted between the two compartments 302, 303, if fuel overflows into one compartment, thus preventing flow of gas to the surge tank in one wing, gases may still flow from that compartment to the other compartment and from there to the surge tank in the other wing. It will of course be appreciated that in certain circumstances the rate of fuel overflow may be great enough to fill one or both of the compartments to overflow. In such a case, both vent pipes to the surge tanks would be blocked and venting would be prevented. However, such rates of fuel overflow only usually occur during refuelling and thus during fuel transfer to or from fuel tanks during normal operating conditions the ability to vent all non-overflowing fuel tanks can be maintained.

Figure 4A:
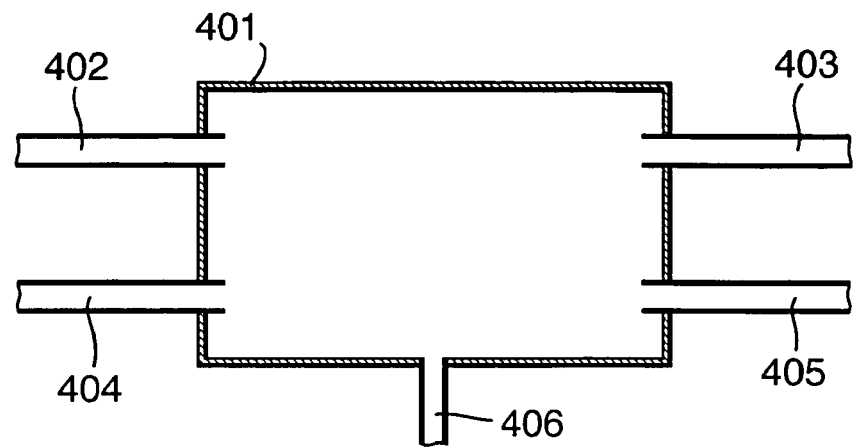
FIGS. 4a and 4b are schematic side-views of alternative venting chamber and venting pipe arrangements suitable for use in an aircraft in accordance with further embodiments of the present invention.
Figure 4B:
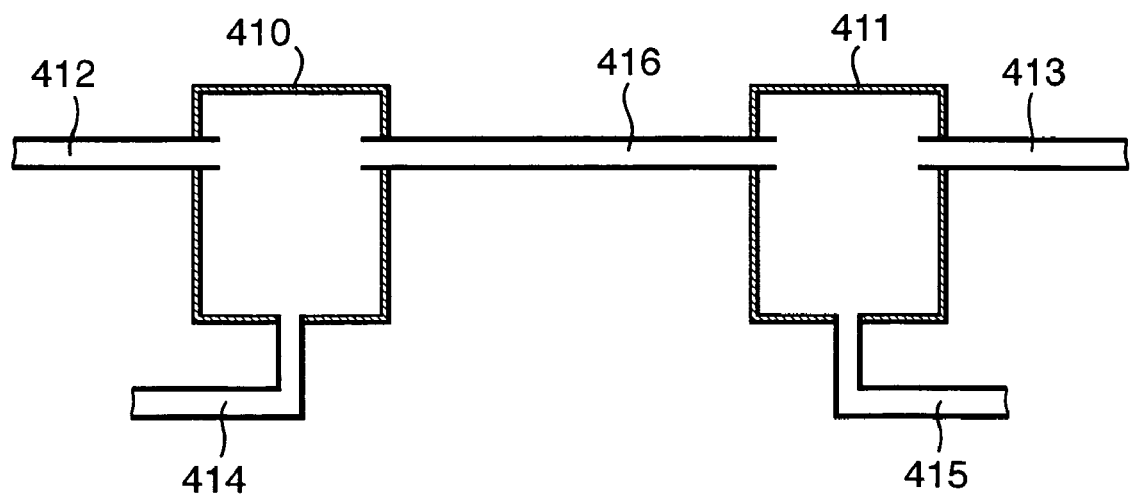

FIGS. 4a and 4b show schematic side-view representations of three alternative arrangements of venting chambers and venting pipes for use in the aircraft of the present invention.

FIG. 4a shows a side view of a venting chamber 401 into which is fed venting pipes 402, 403, 404, 405, there being two pipes at different heights at either side. The chamber 401 is further provided with a fuel overflow outlet 406 in its base. The two pipes 402, 404 on the left-hand side of the chamber 401 are associated with one wing of an aircraft and the two pipes 403, 405 on the other side are associated with a second wing of the aircraft. The upper pipes 402, 403 on each side are connected to fuel tanks (not visible) and the lower pipes 404, 405 on each side are connected to a surge tank (not visible) in a similar manner to that described above with reference to FIG. 1. In use, fuel that enters the venting chamber 401 may either be transferred into one of the respective surge tanks via venting pipes 404, 405 or be transferred to one of the fuel tanks and/or the surge tank via the fuel outlet 406. The fuel outlet 406 is provided with a pump (not visible) to enable the transfer of fuel. Alternatively, the lower pipes 404, 405 may be connected to fuel tanks and the upper pipes 402, 403 may be connected to surge tanks. In this case, it is especially advantageous to provide a fuel outlet 406 and associated pump to prevent fuel from accumulating in the venting chamber 401 to such a level in the chamber 401 that fuel is fed back into the venting pipes 404, 405.

FIG. 4b shows a venting chamber and venting pipe arrangement comprising two venting chambers 410, 411, each associated with a respective wing of an aircraft. Each venting chamber 410, 411 is provided with a side venting pipe 412, 413 associated with respective fuel tanks (not visible) and a venting pipe 414, 415, which extends from the base of each respective chamber and which is connected to a respective surge tank (not visible). Two interconnecting side pipes 416 (only one of which being shown) provide a fluid connection (with inherent redundancy) between venting chambers 410, 411 that allows gases to flow between the chambers 410, 411, but is positioned high enough above the base of the venting chambers 410, 411 that the chance of fuel transfer between the chambers is significantly reduced.

It will be appreciated that various modifications may be made to the above described embodiments without departing from the spirit of the invention. For example, the size of the venting pipes and the general difficulty of routing pipes within a wing dictate that it is possible (and may be desirable) for at least one of the venting pipes 11, 12, 13, 14 shown in FIG. 1 to extend between the respective fuel tank and either the exterior of the aircraft or the surge tank 5, without being directly connected to the venting chamber 6. This may be spatially advantageous if it proves to be problematical running venting pipes from each of the fuel tanks 1, 2, 3, 4 to a venting tank 6 located in the wing carry-through box of the aircraft. The arrangement of the pipes to and from the venting chamber need not be symmetrical. For example, the pipes to the surge tanks could include one pipe entering the venting chamber at the bottom of the chamber and another pipe entering at the side.

The aircraft of FIG. 1 has been described with reference to an anhedral wing. It will be readily apparent to those skilled in the art that the wing may be a dihedral wing, in which case fuel in the venting pipes 11, 12, 13 may drain to the venting chamber 6, but the orientation of the wing would resist siphoning of the fuel from the venting chamber 6 to the surge tank 5.

Whilst it is beneficial to provide an aircraft wherein one venting chamber serves fuel tanks from two wings, the venting chamber may be arranged to serve fuel tanks from only one wing or only one side of the aircraft. Of course, two separate venting chambers may be provided, each serving fuel tanks in one wing only.

The float valves 203, 204 may be further arranged to close the relevant flow paths during aircraft banking manoeuvres; such manoeuvres lead to the orientation of the wing being changed from a normal level-flight attitude which could lead to undesirable flow of fuel from the fuel tanks to the venting pipes, and subsequently into the venting chamber and, eventually, into the surge tank and out of the aircraft.

The venting pipe between the surge tank to the exterior of the aircraft may or may not include a valve arrangement that controls air and/or fuel flow between the surge tank and atmosphere. In the case where the venting system includes a means for inerting (i.e. maintaining a concentration of inert gas in the fuel tanks) it is important that inert gas is not allowed to be unintentionally vented to atmosphere. Thus, the aircraft may be provided with a climb/dive valve between the surge tank and atmosphere. In a steep descent case (for example in an emergency), the air outside the aircraft increases in pressure at a faster rate than inert gas can flow into the tanks through the vent pipes from the inerting system to increase the internal pressure. In such a case the climb/dive valve opens to allow an increased flow of air. In normal cruise conditions the climb/dive valve will be closed to prevent the escape of inert gas from the venting chamber system and/or the fuel tanks. Providing such a climb/dive valve, increases the pressure that the fuel tanks must be able to withstand up to a pressure of about 17 psi, that is, about 120 kPa, as a result of the restriction of fluid flow between the surge tank and atmosphere.

The invention claimed is:

1. An aircraft comprising a plurality of fuel storage chambers located within said aircraft, at least one of said fuel storage chambers being located within a wing of said aircraft, said wing having an outward portion associated with the wingtip and an inward portion, each of at least two of the fuel storage chambers being provided with a venting conduit for permitting fluid communication with a venting chamber of a venting chamber system, wherein the venting chamber is located inwardly of said at least one fuel storage chamber and has a venting outlet for permitting fluid communication between the venting chamber and the exterior of the aircraft, the aircraft comprising a venting chamber conduit provided between the venting outlet of the venting chamber and an overflow chamber, the overflow chamber being provided with an overflow venting outlet for permitting fluid communication between the overflow chamber and the exterior of the aircraft, the overflow chamber being located in the outward portion of the wing.

2. An aircraft according to claim 1, wherein the venting chamber is located inward of said at least two fuel storage chambers.

3. An aircraft according to claim 1, wherein the venting chamber is disposed within a fuel storage chamber located centrally relative to the wings of the aircraft.

4. An aircraft according to claim 1, wherein each of said at least two fuel storage chambers is associated with a mutually different wing of the aircraft.

5. An aircraft according to claim 1, wherein the venting chamber system comprises a plurality of venting regions in fluid communication with each other, but arranged such that during level flight of the aircraft the flow of fuel, if any is present, from one of the venting regions to another of the venting regions is restricted.

6. An aircraft according to claim 5, wherein at least two of the venting regions are defined within the venting chamber by one or more substantially liquid-impermeable partitions that allow venting gases to flow from one venting region to another.

7. An aircraft according to claim 5, wherein the venting chamber system comprises only one venting chamber, with the venting regions being defined within the venting chamber.

8. An aircraft according to claim 5, wherein the venting chamber system comprises a plurality of venting chambers wherein each of at least two of the venting regions is located within a separate venting chamber.

9. An aircraft according to claim 5, wherein each of the venting regions is associated with one or more fuel storage chambers, the fuel storage chambers associated with one of the venting regions all being located in one wing and the fuel storage chambers associated with another of the venting regions all being located in a different wing.

10. An aircraft according to claim 9, wherein each venting region may be provided with a separate venting chamber outlet for permitting fluid communication between the venting region and the exterior of the aircraft.

11. An aircraft according to claim 1, wherein one of said venting conduits includes a valve arrangement that is arranged to restrict the overflow of fuel into the venting conduit.

12. An aircraft according to claim 1, wherein one of said venting conduits includes a fuel storage chamber venting outlet located towards the trailing edge of said wing, said venting conduit connecting said venting outlet via a forwardly extending portion and via an inwardly extending portion to the venting chamber system, the portions being arranged in series and within the fuel storage chamber.

13. A fixed-wing aircraft with two anhedral wings, said aircraft comprising a plurality of fuel tanks located within said aircraft, each of said wings having an outward portion associated with the wingtip and an inward portion, each of at least two of the fuel tanks being located within mutually different wings of the aircraft and being provided with a venting conduit for permitting fluid communication with a venting chamber of a venting chamber system, wherein the venting chamber is disposed within a fuel tank located centrally relative to the wings of the aircraft and is located inwardly of said at least two fuel storage tanks and has a venting outlet for permitting fluid communication between the venting chamber and the exterior of the aircraft, wherein the aircraft further comprises two surge tanks, the surge tanks being located in the outward portion of mutually different wings of the aircraft, a venting chamber conduit being provided between the venting outlet of the venting chamber and each surge tank, each surge tank being provided with an overflow venting outlet for permitting fluid communication between the surge tank and the exterior of the aircraft.

* * * * *

UNITED STATES PATENT AND TRADEMARK OFFICE
CERTIFICATE OF CORRECTION

| | | |
|---|---|---|
| PATENT NO. | : 7,621,483 B2 | Page 1 of 1 |
| APPLICATION NO. | : 11/112859 | |
| DATED | : November 24, 2009 | |
| INVENTOR(S) | : Cozens et al. | |

It is certified that error appears in the above-identified patent and that said Letters Patent is hereby corrected as shown below:

On the Title page,

[*] Notice:     Subject to any disclaimer, the term of this patent is extended or adjusted under 35 USC 154(b) by 660 days.

Delete the phrase "by 660 days" and insert -- by 1191 days --

Signed and Sealed this

Twenty-fourth Day of August, 2010

David J. Kappos
*Director of the United States Patent and Trademark Office*